(12) United States Patent
Tobita (10) Patent No.: US 9,779,550 B2
(45) Date of Patent: Oct. 3, 2017

(54) AUGMENTED REALITY SYSTEM (71) Applicant: SONY CORPORATION, Tokyo (JP)

(72) Inventor: Hiroaki Tobita, Paris (FR)

(73) Assignee: SONY CORPORATION, Tokyo (JP)

(*) Notice: Subject to any disclaimer, the term of this patent is extended or adjusted under 35 U.S.C. 154(b) by 94 days.

(21) Appl. No.: 14/428,698

(22) PCT Filed: Sep. 23, 2013

(86) PCT No.: PCT/EP2013/069699
§ 371 (c)(1),
(2) Date: Mar. 17, 2015

(87) PCT Pub. No.: WO2014/053346
PCT Pub. Date: Apr. 10, 2014

(65) Prior Publication Data
US 2015/0235423 A1 Aug. 20, 2015

(30) Foreign Application Priority Data
Oct. 2, 2012 (EP) .................... 12186931

(51) Int. Cl.
G06T 19/00 (2011.01)
G06T 7/73 (2017.01)
G06T 19/20 (2011.01)

(52) U.S. Cl.
CPC .............. G06T 19/006 (2013.01); G06T 7/74 (2017.01); G06T 19/20 (2013.01); G06T 2207/30204 (2013.01)

(58) Field of Classification Search
CPC .... G06T 19/006; G06T 3/005; H04N 13/0459
See application file for complete search history.

(56) References Cited

U.S. PATENT DOCUMENTS 8,902,254 B1* 12/2014 Laughlin ................ G06T 19/20
345/633
2007/0098234 A1 5/2007 Fiala
2007/0273557 A1 11/2007 Baillot
(Continued)

FOREIGN PATENT DOCUMENTS

CN 101727180 A 6/2010
CN 101887671 A 11/2010
(Continued)

OTHER PUBLICATIONS

Hiroaki Tobita, Shigeaki Maruyama, and Takuya Kuji, Floating Avatar: Blimp-based Telepresence System for Communication and Entertainment, Aug. 7, 2011, In ACM SIGGRAPH 2011 Emerging Technologies, Article No. 4, one page.*
(Continued)

Primary Examiner — Jeffery A Brier
(74) Attorney, Agent, or Firm — Oblon, McClelland, Maier & Neustadt, L.L.P.

(57) ABSTRACT

An augmented reality system including an unmanned moving object and an augmented reality marker arranged on or within the unmanned moving object. The augmented reality system further includes a visual rendering unit that is configured to augment virtual information corresponding to the augmented reality marker and to map the virtual information on the unmanned moving object.

10 Claims, 4 Drawing Sheets

(56) References Cited

U.S. PATENT DOCUMENTS

| | | |
|---|---|---|
| 2009/0195538 A1 | 8/2009 | Ryu et al. |
| 2010/0045869 A1 | 2/2010 | Baseley et al. |
| 2011/0187743 A1 | 8/2011 | Hwang et al. |
| 2012/0056847 A1 | 3/2012 | Milford |
| 2012/0082383 A1 | 4/2012 | Kruglick |
| 2012/0183137 A1* | 7/2012 | Laughlin .............. H04N 7/185 380/200 |

FOREIGN PATENT DOCUMENTS

| | | |
|---|---|---|
| CN | 102194248 A | 9/2011 |
| EP | 2 157 545 A1 | 2/2010 |
| TW | 201200220 A1 | 1/2012 |
| WO | WO 2011/136209 A1 | 11/2011 |

OTHER PUBLICATIONS

Seungyong Oh, Sungchul Kang, Kyungjoon Lee, Sangchul Ahn, and Euntai Kim, Flying Display: Autonomous Blimp with Real-Time Visual Tracking and Image Projection, Oct. 2006, IEEE, In Intelligent Robots and Systems, 2006 IEEE/RSJ International Conference on, pp. 131-136.*
International Search Report issued Nov. 22, 2013 in PCT/EP2013/069699.
CDLHandheldAR, "Advanced Marker-Based Tracking" http://www.youtube.com/watch?v=2Qj-JUPBdFO, XP054975230, 2011, 1 page.
"Moored Balloon" Wikipedia, the free encyclopedia, http://en.wikipedia.org/w/index.php?title=Moored_balloon&oldid=499288045, XP002715861, 2012, 2 pages.
Kazuhiro Hosoi, et al. "Shepherd: A Mobile Interface for Robot Control from a User's Viewpoint" UIST 2006 Adjunct Proceedings, XP002715829, 2006, pp. 89-90.
Marcin Januszka, et al., "Augmented reality system for aiding engineering design process of machinery systems" Journal of Systems Science and Systems Engineering, vol. 20, No. 3, 2011, 18 pages.
Hiroaki Tobita, et al., "Floating Avatar: Telepresence System using Blimps for Communication and Entertainment" CHI EA '11 Proceedings of 2011 annual conference extended abstracts on Human factors in computing systems, 2011, pp. 541-550.
Hiroaki Tobita, "Cloud Interface: Designing Aerial Computer Environment for Novel User Interface" ACE '11 Proceedings of the 8th International Conference on Advances in Computer Entertainment Technology, No. 57, 2011, 8 pages.
"Dennō Coil" Wikipedia, the free encyclopedia, http://en.wikipedia.org/wiki/Denn%C5%8D_Coil, 2014, 10 pages.
Hideki Koike, et al., "Interactive Textbook and Interactive Venn Diagram: Natural and Intuitive Interfaces on Augmented Desk System" CHI 2000 Papers, vol. 2, No. 1, 2000, pp. 121-128.
Jun Rekimoto, "Matrix: A Realtime Object Identification and Registration Method for Augmented Reality" Sony Computer Science Laboratory, Inc., 1998, pp. 1-6.
Hirokazu Kato, et al., "Marker Tracking and HMD Calibration for a Video-based Augmented Reality Conferencing System" Faculty of Information Sciences, Hiroshima City University, 1999, 10 pages.
Jun Rekimoto, et al., "CyberCode: Designing Augmented Reality Environments with Visual Tags" Interaction Laboratory, Sony Computer Science Laboratories, Inc., 2000, 10 pages.
Roy Want, et al., "Bridging Physical and Virtual Worlds with Electronic Tags" CHI 99 Papers, 1999, pp. 370-377.
Thad Starner, et al., "Augmented Reality Through Wearable Computing" The Media Laboratory, Massachusetts Institute of Technology, 1997, 24 pages.
Darnell J. Moore, et al., "Implementing Phicons: Combining Computer Vision with InfraRed Technology for Interactive Physical Icons" CHI Letters, vol. 1, 1999, pp. 67-68.
Yuji Ayatsuka, et al., "Active CyberCode: A Directly Controllable 2D Code" CHI, 2006, 6 pages.
Yuji Ayatsuka, "Fractal Codes: Layered 2D Codes with a Self-Similar Layout" Interaction Laboratory, Sony Computer Science Laboratories, 2007, pp. 1-4.
Hideki Koike, et al., "Transparent 2-D Markers on an LCD Tabletop System" CHI 2009—New Tabletop Input and Output Methods, 2009, pp. 163-172.
Jun Rekimoto, et al., "Augmented Surfaces: A Spatially Continuous Work Space for Hybrid Computing Environments" CHI 99 Papers, 1999, pp. 378-385.
Minoru Kojima, et al., "Augmented Coliseum: An Augmented Game Environment with Small Vehicles" Proceedings of the First IEEE International Workshop on Horizontal Interactive Human-Computer Systems (TABLETOP '06), 2006, 6 pages.
Nobuyuki Matsushita, et al., "ID CAM: A Smart Camera for Scene Capturing and ID Recognition" Proceedings of the Second IEEE and ACM International Symposium on Mixed and Augmented Reality (ISMAR'03), 2003, 10 pages.
Takuji Narumi, et al., "Augmented Reality Flavors: Gustatory Display Based on Edible Marker and Cross-Modal Interaction" CHI 2011, Section: Olfaction, Breath & Biofeedback, 2011, pp. 93-102.
Jed Berk, et al., "Autonomous Light Air Vessels (ALAVs)" MM'06, 2006, pp. 1029-1030.
Hideki Yoshimoto, et al., "Design of Installation with Interactive UAVs" Advances in Computer Entertainment Technology, 2008, p. 424.
Eric Paulos, et al., "PRoP: Personal Roving Presence" CHI 98 Papers, 1998, pp. 296-303.
"The Eye of Judgement" https://www.playstation.com/en-us/games/the-eye-of-judgement-ps3/, 2015, 4 pages.
Hiroo Iwata, "Floating Eye" http://www.iamas.ac.jp/interaction/i01/works/E/hiroo.html, 2015, 1 page.
"Billy Kluver and Andy Warhol: Silver Clouds" http://www.warhol.org/education/resourceslessons/Billy-Kluver-and-Andy-Warhol—Silver-Clouds/, 2015, 2 pages.
Yasue Kishino, et al., "A Ubiquitous Computing Environment Composed by Cooperation between Visual Markers and Event-Driven Compact Devices" Proceedings of the 2005 International Workshop on Ubiquitous Data Management (UDM'05), 2005, 8 pages.
"Ads in the Air: Digital Signage" http://www.fogscreen.com, 2015, 2 pages.
Jun Rekimoto, et al., "The World through the Computer. Computer Augmented Interaction with Real World Environments" UIST'95, 1995, pp. 29-36.
"World Club Champion Football 2013-2014" WORLD CLUB Champion Football Official Web Site, http://www.wccf.jp/howto.html, 2015, 9 pages (with English language translation).
"Kinect for Windows" https://www.microsoft.com/en-us/kinectforwindows/meetkinect/default.aspx, 2015, 2 pages.
Takafumi Aoki, et al., "Kobito-Virtual Brownies-" Tokyo Institute of Technology, 2005, 1 page.
Yusuke Nakazato, et al., "Discreet Markers for User Localization" Nara Institute of Science and Technology, 2004, pp. 172-173.
"Manchester code" Wikipedia, the free encyclopedia, http://en.wikipedia.org/wiki/Manchester_code, 2015, 3 pages.
"AR.Drone2.0" https://web.archive.org/web/20150528225253/http://ardrone2.parrot.com/, 2015, 18 pages (with English language translation).
Georg Klein, et al., "Parallel Tracking and Mapping for Small AR Workspaces" Proceedings of ISMAR '07, 2007, 10 pages.
Mark Weiser, et al., "The Coming Age of Calm Technology" Xerox PARC, http://www.teco.edu/lehre/ubiq/ubiq2000-1/calmtechnology.htm, 1996, 4 pages.
Byungsung Lee, et al., "Manipulation of Virtual Objects in Markerless AR System by Fingertip Tracking and Hand Gesture Recognition" ICIS, 2009, 6 pages.
"KRCF-Naked Bandit/Here, Not Here/White Sovereign" http://jardinsdespilotes.org/projects/neuralgic/artists/krcf/index.html, 2015, 3 pages.
Kim Binsted, "HyperMask: Virtual Reactive Faces for Storytelling" Sony Computer Science Laboratories, 1999, 1 page.
John Underkoffler, et al., "Emancipated Pixels: Real-World Graphics In The Luminous Room" SIGGRAPH 99, 1999, pp. 385-392.

(56) References Cited

OTHER PUBLICATIONS

Yuji Ayatsuka, et al., "ChatScape: a visual informal communication tool in communities" CHI'01 Extended Abstracts on Human Factors in Computing Systems, 2001, 1 page (submitting English Abstract only).
Hidenori Kawamura, et al., "Motion Design for Indoor Blimp Robot with PID Controller" Journal of Robotics and Mechatronics, vol. 17, No. 5, 2005, pp. 500-501.
Hiroki Kunimura, et al., "Baby Robot "YOTARO" " International Federation for Information Processing, 2010, pp. 1-8.
Toshiki Sato, et al., "Photoelastic Touch: Transparent Rubbery Tangible Interface using an LCD and Photoelasticity" UIST'09, 2009, 8 pages.
Nobuyuki Matsushita, et al., "HoloWall: Designing a Finger, Hand, Body, and Object Sensitive Wall" UIST 97, 1997, pp. 209-210.
Jun Rekimoto, "Sensonomy: Intelligence Penetrating into the Real Space" IUI'09, 2009, p. 3 (submitting English Abstract only).
Nicole Yankelovich, et al., "Porta-Person: Telepresence for the Connected Conference Room" CHI 2007, Work-in-Progress, 2007, pp. 2789-2794.
Abigail Sellen, et al., "Using Spatial Cues to Improve Videoconferencing" CHI '92, 1992, pp. 651-652.
Jun Rekimoto, "SmartSkin: An Infrastructure for Freehand Manipulation on Interactive Surfaces" Letters CHI, vol. 4, No. 1, 2002, pp. 113-120.
Jun Mitani, et al., "Making Papercraft Toys from Meshes using Strip-based Approximate Unfolding" University of Tokyo, 2004, pp. 259-263.
"Xbox 360+Kinect" https://web.archive.org/web/20120301040716/http:/www.xbox.com/en-US/Kinect, 2015, 2 pages.
Ismo Rakkolainen, "Mid-air Displays Enabling Novel User Interfaces" SAME '08, 2008, pp. 25-30.
Masahiko Inami, et al., "Optical Camouflage Using Retro-reflective Projection Technology" Proceedings of the Second IEEE and ACM International Symposium on Mixed and Augmented Reality (ISMAR '03), 2003, 2 pages.
Brygg Ullmer, et al., "The metaDESK: Models and Prototypes for Tangible User Interfaces" Proceedings of UIST'97, 1997, pp. 1-10.
Gina Venolia, et al., "Embodied Social Proxy: Connecting Hub-and-Satellite Teams" CSCW 2010, 2010, pp. 633-634.
"Texai Remote Presence System" http://www.willowgarage.com/pages/texai/overview, 2015, 2 pages.
"Talking Head Projection" http://www.naimark.net/projects/head.html, 2015, 1 page.
Hiroshi Ishii, et al., "ClearBoard: A Seamless Medium for Shared Drawing and Conversation with Eye Contact" CHI '92, 1992, 10 pages.
Minoru Asada, et al., "Cognitive Developmental Robotics: A Survey" IEEE Transactions on Autonomous Mental Development, vol. 1, No. 1, 2009, pp. 12-34.
"ARToolKit" http://www.hitl.washington.edu/artoolkit/, 2015, 1 page.
"Seaman2" http://www.seaman.tv/seaman2/, 2015, 1 page.
Combined Chinese Office Action and Search Report issued Jul. 19, 2016 in Patent Application No. 201380051941.1 (with English translation of Categories of Cited Documents).
Deng Bao-Lin, et al., "The Control System of the Cleaning Robot Automatically Avoiding a Obstacle" China Science and Technology Information, Aug. 2015, 6 Pages with English translation.
Combined Office Action and Search Report issued on Mar. 13, 2017 in Chinese Patent Application No. 201380051941.1 with English translation of categories of cited documents.

* cited by examiner

AUGMENTED REALITY SYSTEM

CROSS-REFERENCE TO RELATED APPLICATIONS

The present application is based on PCT/EP2013/069699 filed Sep. 23, 2013, and claims priority to European Patent Application 12 186931.7, filed in the European Patent Office on Oct. 2, 2012, the entire contents of each of which being incorporated herein by reference.

BACKGROUND

Field of the Disclosure

The present disclosure relates to an augmented reality system. In particular, the present disclosure relates to an unmanned moving object based augmented reality marker.

Description of Related Art

To integrate the real and virtual worlds, 2D augmented reality (AR) markers have been developed. Through a video camera an AR system recognizes the 3D position and a unique ID of an AR marker and then overlays virtual information on the AR marker. Thus, through the AR marker users can see virtual information overlaid over the real world.

SUMMARY

It is an object to provide an improved augmented reality system.

According to an aspect, there is provided an augmented reality system, comprising:
an unmanned moving object;
an augmented reality marker arranged on or within said unmanned moving object; and
a visual rendering unit that is configured to augment virtual information corresponding to the augmented reality marker and to map said virtual information on the unmanned moving object.

According to a further aspect, there is provided an unmanned moving object with an augmented reality marker arranged on or within said unmanned moving object for use in an augmented reality system as referenced above.

Preferred embodiments are defined in the dependent claims. It shall be understood that the claimed unmanned moving object has similar and/or identical preferred embodiments as the claimed augmented reality system and as defined in the dependent claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

AR is a live, direct or indirect, view of a physical, real-world environment whose elements are augmented by computer-generated sensory input such as sound, video, graphics or GPS data. In other words, AR is about augmenting the real-world environment with virtual information by improving people's senses and skills. AR mixes virtual information and characters with the actual world. The present disclosure mainly focuses on mixing virtual video or image information with real-world information, but is not limited thereto.

The application of 2D AR markers has two limitations: one limitation is that the relationship between the AR marker and the user remains virtually the same as the AR marker is printed or located on a static two-dimensional piece of paper. This means that users have to spot paper including the AR marker arranged thereon, approach it and capture its image with a camera device to initiate interaction. Also, the virtual information displayed by the marker depends on its position, so the information cannot move to an area where users cannot capture the marker. Consider characters in games, comics and animated cartoons (e.g. humans, creatures, robots and vehicles). They can move freely in the scene and sometimes fly in the air. In contrast, the movement of characters of an AR marker is inhibited for a simple reason. If users mainly capture and follow a character instead of the marker, the character disappears when the marker is out of camera range. There is thus a gap between AR and animated characters from the view point of motion.

The other limitation is the reality of the virtual information. The virtual information is usually projected above the piece of paper on which the AR marker is arranged. The virtual information thus virtually appears above the AR marker. Users cannot touch the virtual information directly, so they receive no feedback from the character; his or her fingers pass right through the virtual information. Although some markers have physical attributes, they are limited to expressing the volume of VR information. As a result, there is a gap between an AR marker and virtual information corresponding thereto.

One of the aspects of the present disclosure is the usage of an unmanned moving object with an AR marker arranged thereon. The AR marker proposed herein is able to move together with the unmanned moving object and is thus able to move towards a user/observer. Thus, the relationship between the user and the AR marker may change dynamically. In contrast to a static paper-based AR marker, the virtual information is mapped on the unmanned moving object. Since the unmanned moving object has a "real" physical, three-dimensional shape, a user may have a "real" haptic feedback when trying to touch the virtual information. The virtual information thus appears to also have a physical volume. Virtual information corresponding to the AR marker is mapped on the surface of the unmanned moving object, i.e. overlaid on the outer surface of the unmanned moving object, like texture mapping in 3D computer graphics, making the virtual information tangible. Thus, a dynamical and physical interaction between the user and the virtual information is possible.

The unmanned moving object could be any 3D object that may be moved by means of some actuators. It could be, for example, realized as a radio-controlled device, such as a radio-controlled car, boot, aircraft or the like. According to an embodiment the unmanned moving object is realized as an unmanned flying object. Due to its ability to fly or float in the air, the unmanned flying object including the AR marker arranged thereon may also be called "Aero-Marker". By attaching the AR marker to an unmanned flying object, the marker may move freely and fly in the air. Thus, the marker can approach users to initiate interaction. Custom designed flying objects can easily be constructed to represent a wide variety of objects, such as comic and animated characters on the basis of their shapes and behaviour. According to an exemplary embodiment, the unmanned flying object is realized as a blimp comprising a gas-filled envelope. Blimps can float and move freely through the air. Many people can be informed of events through images and text displayed on the floating blimp. The code of the AR marker arranged on the blimp may contain information that is used in a rendering unit to augment virtual information corresponding to the AR marker and to map said virtual information on at least a part of the outer surface or even on the entire outer surface of the blimp. For example, information can be overlaid on the entire surface of the blimp by using texture mapping, like in 3D computer graphics. Thus, a unique object that has a virtual appearance and physical features can be created. The blimp physically exists and can be touched by a user in contrast to conventional paper-based static 2D AR markers which do not have an own physical appearance, but only create a virtual object that has no own real physicality.

The approach of the presented augmented reality system based on mobility and physical features is useful for new types of entertainment and communication such as AR games and live-size VR gaming systems. In addition, since the ID and position of the AR marker can be recognized, its motion and orientation can be adjusted on the basis of the user's position. Moreover, since the AR mark can float overhead, several people can see and obtain virtual information at the same time. Users can interact with the blimp-based augmented reality system both directly and indirectly. Users can move to the blimp, or the blimp can move to the users depending on the application and the user's needs.

It shall be understood that also unmanned flying objects other than blimps may be used in the system according to the present disclosure. Radio-controlled helicopter systems also make it possible to apply the herein proposed concept of flexible interaction. However, they are noisy and produce wind while moving, so they are, in contrast to very silent and lightweight blimps, difficult to use in indoor environments. They can also only fly for several minutes, because they require more battery power than blimps. In contrast thereto, a blimp is almost weightless, so it can be moved by only weak power produced by one or several small actuators.

It shall be pointed out that the term "blimp" according to the present disclosure refers to any type of free-flying airship. It is not limited to any specific type, shape, colour or any special characteristic of such a blimp. A blimp may be understood as any type of non-rigid, semi-rigid or rigid airship that uses a gas-filled envelope or a ballonet causing a buoyant force.

Figure 1A:
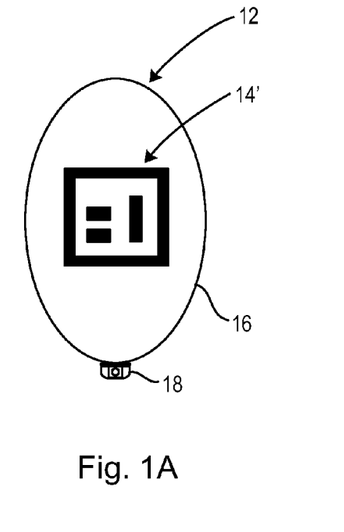
FIG. 1 shows exemplary side views schematically illustrating a first embodiment of an augmented reality system according to the present disclosure.
Figure 1B:
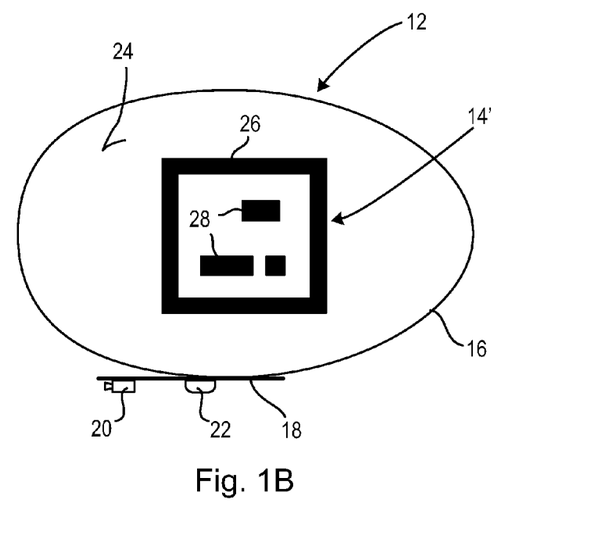
Figure 2A:
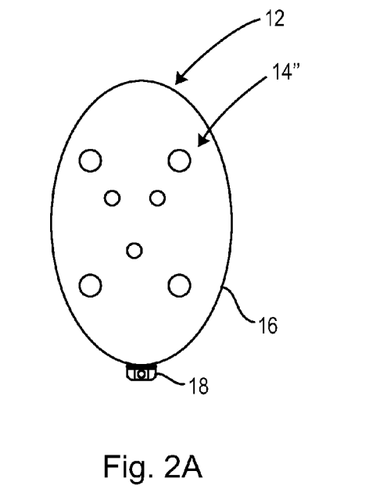
FIG. 2 shows exemplary side views schematically illustrating a second embodiment of the augmented reality system according to the present disclosure.
Figure 2B:
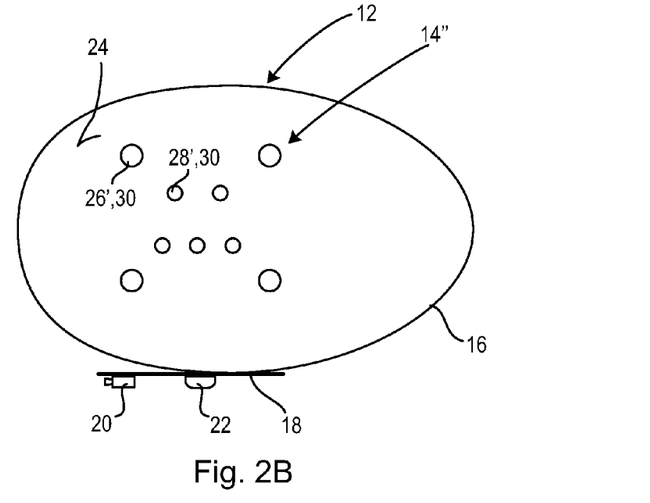

Referring now to the drawings, wherein like reference numerals designate identical or corresponding parts throughout the several views, FIGS. 1 and 2 schematically illustrate two different embodiments of an unmanned moving object 12 and an augmented reality marker 14 (AR marker) that may be used in an augmented reality system 10 according to the present disclosure. The unmanned moving object 12 is herein illustrated as an unmanned flying object, specifically as a blimp 12. The blimp 12 comprises a gas-filled envelope 16 and a gondola 18 that is attached thereto. The gondola 18 is sometimes also denoted as buckle 18 of the blimp 12. The gondola 18 may carry several mobile devices, such as a camera 20 and/or a speaker 22, as this will be explained further below with reference to FIG. 7. However, it is to be noted that the gondola 18 as well as the devices arranged thereon are only optional, but no mandatory features. Furthermore, it shall be noted that the unmanned moving object 12 may also be realized as a different 3D device, i.e. not necessarily as a blimp.

The AR marker 14 is preferably arranged on an outer surface 24 of the gas-filled envelope 16 of the blimp 12. According to the first embodiment that is schematically illustrated in FIG. 1, the AR marker 14 is realized as a fixed AR marker 14'. The fixed AR marker 14' may, for example, be painted onto the blimp's surface 24. Alternatively, black tape may be used rather than paint to facilitate changing the pattern and size of the AR marker 14'. The AR marker 14' represents a 2D matrix code. The 2D matrix code itself may be similar to the cyber code known from Rekimoto et al.: "Cyber Code: Designing Augmented Reality Environments with Visual Tags", in Proceedings of DARE, pp. 1-10, 2000. Such AR codes and corresponding algorithms are open source. An AR tool kit is also known from Kato et al.: "Marker Tracking and HMD Calibration for a Video-Based Augmented Reality Conferencing System", in Proceedings of IWAR '99, 1999.

The fixed AR marker 14' shown in FIG. 1 comprises a rectangle 26 and a dot pattern 28 inside the rectangle 26. The rectangle 26 is used to identify the position of the AR marker 14'. The dot pattern 28 represents a unique ID (code). Using a simple imaging process, a system may thus recognize the position and ID of the AR marker 14' simultaneously. In order to be able to also determine the relative spatial orientation of the AR marker 14', the dot pattern 28 is in most cases (but not mandatory) asymmetric.

An alternative approach of generating an AR marker 14 is schematically illustrated in FIG. 2. According to the second embodiment, a flexible AR marker 14" is used that is generated by one or a plurality of light sources 30. LEDs may be used to generate the different parts of the flexible AR marker 14". In contrast to the fixed AR marker 14' used according to the first embodiment (FIG. 1), a flexible AR marker 14" as used according to the second embodiment (FIG. 2) has several advantages. First of all, it is easier to flexibly change the ID (code) of the AR marker 14" by using LEDs. Secondly, flexible AR markers 14" using LEDs may also be identified under dark lighting conditions, since they are not sensitive to the lighting conditions in the surrounding. LED markers provide sustainable recognition even in dark rooms. As an IR camera may be used to identify the LED marker 14", it may also be recognized under bright light conditions. Thirdly, the flexible AR marker 14" may not necessarily be visible for the eyes of an observer. Instead, a fixed black and white pattern 14' as used according to the first embodiment could annoy users. The detailed arrangement and technique using flexible LED markers 14" will be explained in detail further below with reference to FIGS. 5 and 6.

Independent of the type of AR marker 14 used, it is one of the central points of the present disclosure to arrange the AR marker 14 on the outer surface 24 of a blimp 12. Using a blimp 12 to implement an AR marker 14 overcomes the limited mobility of conventional paper-based AR markers. It enables the AR marker 14 to move freely and fly in the air. Thus, the AR marker can approach users to initiate interaction. It also enables both the AR marker 14 and the corresponding virtual information to be designed in an almost free manner. Custom-designed blimps 12 can easily be constructed to represent a wide variety of objects, such as comic and animated characters on the basis of the blimp's shape and behaviour. The virtual information corresponding to the AR marker 14 may be mapped on the outer surface 24 of the gas-filled envelope 16 of the blimp 12. Since the blimp size and shape can be freely designed, the virtual information can, for example, be overlaid on the entire surface 24 of the blimp. Thus, a unique object that has a virtual appearance and physical features can be created. Since the virtual information is virtually overlaid over the envelope 16 of the blimp 12, by touching the envelope 16 of the blimp 12, users may have the feeling that the virtual information really exists. By touching the blimp 12, users recognize a "real" tactile feedback. In other words, the physical features of the blimp 12 enable users to touch the virtual information, and the mobility of the blimp 12 enables virtual characters (created by virtual information) to approach users and initiate communication. The result is a tangible marker. As the virtual information is preferably overlaid on the entire surface of the blimp 12, the blimp 12 itself becomes an information node with tangible features. Since the node, meaning the blimp 12, is almost weightless even it is large, users can easily lift, move, and throw it.

The herein presented approach using blimps 12 as marker carriers allows designing large physical blimps, since they are usually filled with helium and are therefore almost weightless. In addition, since the blimp 12 can float in the air, it can move toward a user without using special equipment or properties, like a magnetic field. The blimp 12 moves toward a user only when the user needs it, so the user can make more effective use of the real space.

Even though it is herein mainly referred to a blimp used as unmanned flying object 12, it is to be noted that also other unmanned flying objects 12 may be used without leaving the scope of the present disclosure. Helicopters or quad-copters would also be an option to attach an AR marker 14 thereto and thereby achieve a floating AR marker.

A fixed AR marker 14' as well as a flexible LED AR marker 14" could be attached to such an unmanned flying object 12 in a similar way as explained above. However, the use of such an unmanned flying object could be dangerous, because propellers that are used therein are usually bigger and rotate more quickly than those which might be used to move a blimp. Safety might therefore be an issue. Also, the battery has a limited lifetime, so a helicopter could suddenly fall on a user and hurt a user when the battery runs out.

Figure 3:
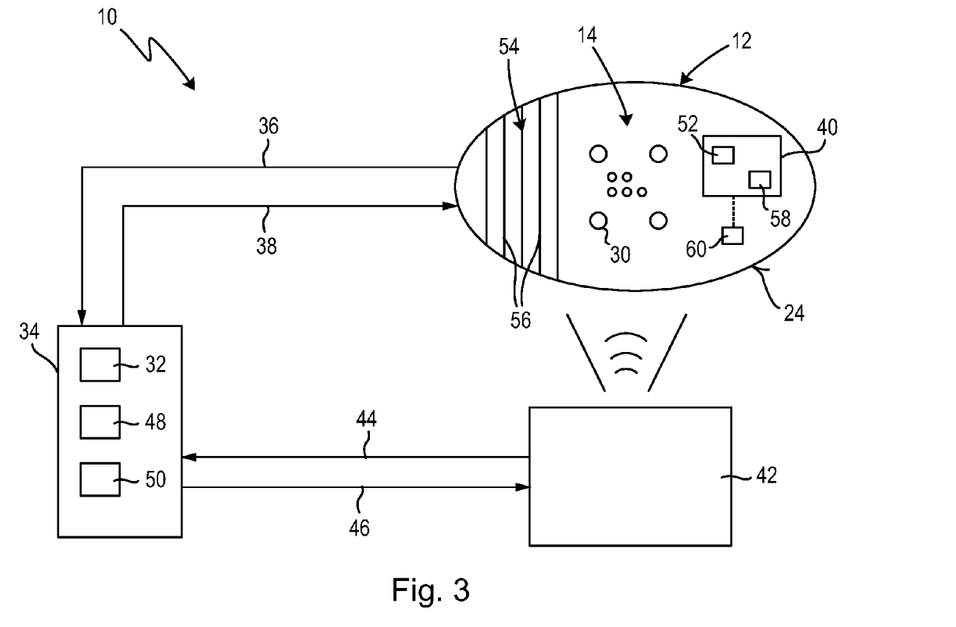
FIG. 3 shows a schematic diagram illustrating a principle setup of the augmented reality system according to the present disclosure, FIG. 4 schematically illustrates a virtual texture mapping that is used according to the present disclosure to map virtual information on a surface of an unmanned flying object, FIG. 5 schematically illustrates a detailed view of the second embodiment of the augmented reality system according to the present disclosure.

FIG. 3 schematically illustrates the general setup and design of the augmented reality system 10 according to an embodiment of the present disclosure. It is to be noted that not all features illustrated in FIG. 3 are mandatory features. FIG. 3 also illustrates some optional features that may be included in the augmented reality system 10. As already explained above with reference to FIGS. 1 and 2, the augmented reality system 10 comprises an unmanned flying object 12, that is preferably realized as a blimp 12, an augmented reality marker 14 arranged on or within said blimp 12, and a visual rendering unit 32. The visual rendering unit 32 is configured to augment virtual information corresponding to the AR marker 14 and to map said virtual information on the outer surface 24 of the blimp 12. The visual rendering unit 32 is configured to map said virtual information on at least a part of said outer surface 24 of the blimp 12. According to an embodiment, the visual rendering unit 32 may be configured to use texture mapping to virtually overlay said virtual information on the entire outer surface 24 of the blimp 12.

The visual rendering unit 32 may be a part of a mobile or still-standing computing device 34. The computing device 34 may be realized as any type of computing device, such as a mobile computer, a desktop PC, a PDA or a Smartphone, for example. The visual rendering unit 32, i.e. the computing device 34, may according to one embodiment communicate with the blimp 12. It may receive information from the blimp 12 (indicated by arrow 36) and transmit information to the blimp 12 (indicated by arrow 38). The blimp 12 may thereto be equipped with a mobile processing unit 40 (MPU) and any type of communication interface (not shown). The connection between the blimp and the computing device 34 may either be a hard-wired or a wireless connection. The MPU may, for example, be realized by a microcontroller. It is to be understood that the blimp may also comprise several MPUs or several processing units integrated into one MPU. In case of a wireless connection (which is preferred), the communication interface may, for example, be realized as a radio transceiver, Wi-Fi transceiver, WLAN interface, Bluetooth interface or as an infrared interface. Thus, the blimp 12 may work as both a client and a server. It is of course also possible to arrange the visual rendering unit 32 within the blimp 12 itself. However, a communication as described above is not mandatory. The visual rendering unit may, according to an embodiment, also be integrated into the unmanned moving object 12.

As shown in FIG. 3, the augmented reality system 10 may further comprise a visualization unit 42 that is connected (either hard-wired or wireless) to the visual rendering unit 32 (either directly or indirectly over the computing device 34). The visualization unit 42 is configured to visualize the real environment including the blimp 12 augmented with the virtual information mapped thereon. It thereto transmits the captured image of the real environment (indicated by arrow 44) to the computing device 34 and receives the overlaid virtual information (indicated by arrow 46) that has been rendered in the visual rendering unit 32. The visualization unit 42 may, for example, be realized as a wearable head-mounted display (HMD, e.g. a Sony HMZ-T1) or as a portable device mounted on a video camera (e.g. PlayStation Eye). However, it is also conceivable that a user uses a Smartphone as visualization unit 42.

A video camera integrated in the visualization unit 42 may capture real-world images at 60 fps. Thereto a conventional digital camera may be used. In case the AR marker is generated with LEDs (as described above with reference to FIG. 2) an infrared camera or a camera with an IR filter may be used. In this way, the system recognizes the ID of the AR marker 14 arranged on the blimp 12, determines its position and relative spatial orientation using known image processing, and then transmits the corresponding rendered virtual information to the visualization unit 42 (e.g. to the HMD). The computing device 34 may thereto comprise a marker identification unit 48 and a motion detection unit 50. The marker identification unit 48 receives the image of the real environment including the blimp 12 and detects the AR marker 14 within said image. The motion detection unit 50 e.g. detects a motion, a spatial orientation and/or a distance of the AR marker 14 relative to the observer (i.e. relative to the visualization unit 42). The visual rendering unit 32 is configured to adapt e.g. a size, orientation and position of the virtual information mapped on the blimp 12 according to the detected motion, the spatial orientation and the distance of the AR marker 14 relative to the observer. This information is finally transmitted (indicated by arrow 46) to the visualization unit 42, where the virtually augmented image including the real environment and the blimp 12 overlaid with the rendered virtual information is visualized to the user/observer.

Figure 8:
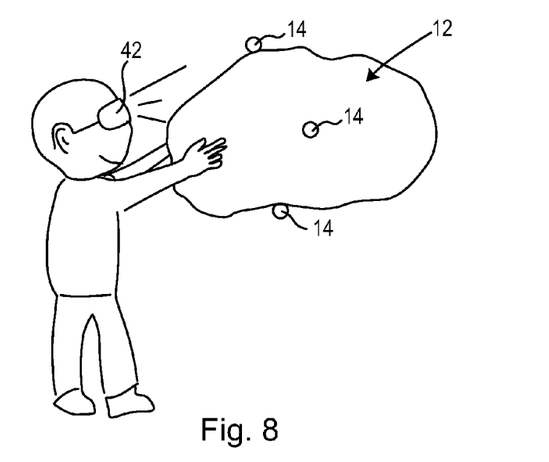

FIG. 8 schematically shows how a user may interact with the blimp 12. As explained above, the user does not only see the virtual information overlaid over the surface of the blimp 12, but also receives a tactile feedback when touching the blimp 12. As blimps 12 are usually very lightweight, it is easy for the user to interact with the blimp 12. There is no danger that the user might get hurt. This is mainly due to the very flexible properties of the blimp 12. The envelope 16 of the blimp 12 is, according to an embodiment, preferably made of a vinyl chloride sheet and filled with helium. Thus it feels safe and soft. The augmented reality system 10 is therefore also suitable for children. If a vinyl sheet is used for the envelope and LED light that people cannot see, the blimp is almost transparent under certain lighting conditions. Thus, it is possible to make it more transparent by using a different material. Users can see the objects with virtual information only when they wear an HMD or a portable device mounted on a video camera. If the blimp is transparent, the AR marker 14 can also be arranged inside the blimp 12. Besides the abovementioned possibility to change the appearance of the virtual information in response to a user touching the blimp 12, it is according to an embodiment of the present disclosure also possible that the virtual information changes with the distance of the user relative to the blimp. This enables a more useful visualization, because the marker floats in the air. When the blimp 12 is far from people, the virtual information might be exaggerated to attract them, such as by having a virtual bird spread his or her wings and by adding objects around the blimp 12 like particle effects.

Figure 4A:
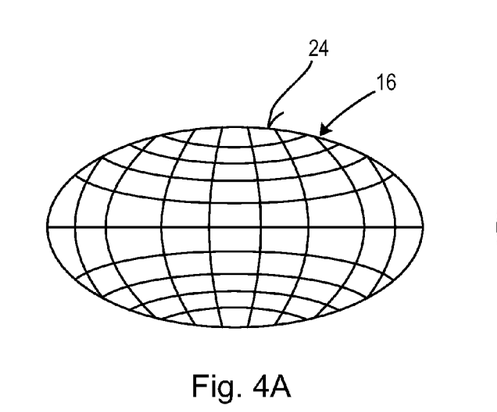
Figure 4B:
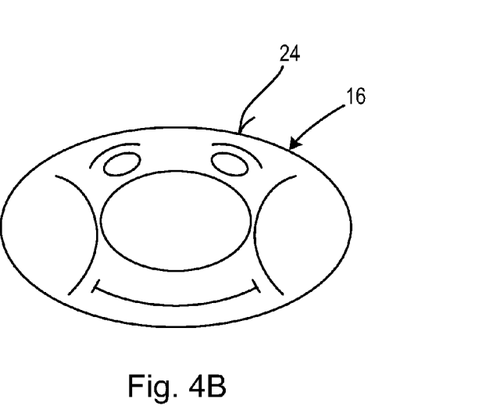

As already mentioned above, the overlay of virtual information on the entire or a part of the surface of the blimp 12 as accomplished herein is preferably similar to texture mapping in computer graphics. This is exemplarily illustrated in FIGS. 4a and 4b. Texture mapping is used to make virtual objects real and tangible. After the system recognizes the position and ID of the AR marker 14, it maps virtual texture onto the blimp using a calculation mesh grid (see FIG. 4a). As a result, a unique object is created that has a virtual appearance and physical features. Any type of virtual texture can be mapped onto the outer surface 24 of the gas-filled envelope 16 of the blimp 12. FIG. 4b exemplarily shows a smiley face of a comic character. However, it is clear that also other types of images and text can be mapped onto the blimp's outer surface 24 using the herein proposed technique. A wide variety of effects may be supported, including bump mapping, colour blending, and cartoon rendering.

Thus, a wide variety of texture effects and materials can be used to make the blimp surface 24 more realistic. Although the 3D object is the same, the use of different materials changes its appearance. The effect can thus be individually tailored to match the application, similar as this can be done by adapting the shape and size of the blimp 12.

An exemplary visualization technique is known from the abovementioned paper of Rekimoto et al. Rekimoto uses two layers: a background and a virtual information layer. The background layer is used to set the real-world information, wherein the virtual information layer is used to display virtual objects onto the marker's position. However, as the herein proposed system 10 allows users touch interactions with the virtual objects (blimp 12), the system according to the present disclosure preferably makes use of an additional skin mask layer to display the hand of a user. By combining these three layers, the skin of the user is overlaid onto the virtual object. The user may thus also see his/her own hands while touching the virtual blimp 12, making the appearance and tactile feeling even more realistic.

Returning back to FIG. 3, even more features of the augmented reality system 10 according to the present disclosure shall be presented in the following. The blimp 12 may also be equipped with a lighting control unit 52 that controls the at least one light source 30 in order to project a plurality of different AR markers on the envelope 16 of the blimp 12. As already mentioned above, the light sources may be realized as LEDs used for displaying the AR marker information. The lighting control unit 52 may either be a part of the MPU 40. However, it may also be integrated in a separate MPU.

The blimp 12 may furthermore comprise at least one touch sensor 54 by help of which users can change the attributes of the blimp interactively when touching the blimp 12. The blimp 12 may contain several such touch sensors 54, so the blimp 12 can detect and react to the user's actions, such as touching the outer surface 24 of the envelope 16 of the blimp 12. The touch sensors 54 may be realized as conductive threads 56 that are arranged on or integrated into the outer surface 24 of the envelope 16 of the blimp 12. The conductive threads 56 may either be arranged over a part of the outer surface 24 or over the entire outer surface 24. The conductive threads 56 may be controlled by the MPU 40. The one or more MPUs may be connected to XBee modules for communication with the media server 34, which controls the on/off timing of each LED and changes the marker ID. Thus, if a user touches the blimp, a touch signal may be generated by the touch sensors 54, this touch signal may be sent to the media server/computing device 34. Accordingly, the system may change the type of overlaid information over the blimp 12, create a sound or any other type of reaction in response to the user's touch. This significantly increases the interactivity of the proposed augmented reality system 10. If in this case the AR marker 14 is generated by LEDs as explained above, it is easy to change the ID of the AR marker as well as the corresponding virtual information in response to a user interaction (a user touching the blimp 12). By attaching conductive threads onto the surface, it becomes a multi-touch surface. By deliberately arranging the layout of the conductive threads 56, the system 10 can provide effective touch input depending on the applications.

Additionally or alternatively, the augmented reality system 10 may further comprise at least one ultrasonic sensor 60 that is arranged on or within the blimp 12 and is able to detect obstacles in the surrounding of the blimp 12. In response, the ultrasonic sensor 60 generates a corresponding detection signal. A movement control unit 58, which may either be a separate unit or integrated into the MPU 40, may be arranged to control a movement of the blimp in dependency of the detection signal generated by the at least one ultrasonic sensor 60. The concept of moving the blimp 12 will be explained further below with reference to FIGS. 9 and 10. By using ultrasonic sensors 60, the system can detect obstacles such as other blimps 12, walls and/or columns. The ultrasonic sensors 60 may also be used to prevent collisions with users walking around the blimp 12.

The at least one ultrasonic sensor 60 may be arranged either on the gondola 18 of the blimp 12 or on the outer surface 24 of the envelope 16 of the blimp 12. According to a preferred embodiment, the system 10 preferably comprises four or six ultrasonic sensors 60 arranged on each spatial side (front, back, left, right, bottom and top) of the blimp 12. In this case, the blimp 12 can detect obstacles on each side of the blimp through its ultrasonic sensors and automatically avoid them. Therefore, users do not need to actively control the blimp 12, because the control of the blimp 12 may be set to automatic mode.

An algorithm may be used to set the motion of the blimp 12 (or any other flying object used) when detecting obstacles, which algorithm decides the blimp's direction. In case ultrasonic sensors 60 determine the distances between the sensors and the obstacles, the blimp 12 may decide which direction to go next based on the results. A very simple algorithm may be implemented as follows:

```
loop{
if (FrontSensorValue<FrontSensorThreshold){SetBack;}
else{if(RightSensorValue<RightSensorThreshold){TurnLeft;}
else if(LeftSensorValue<LeftSensorThreshold){TurnRight;}
else{GoStraight;}}
UnderMotorForce = k·(UnderSensorValue)+b
//k,b are adjustment numbers}
```

Figure 5:
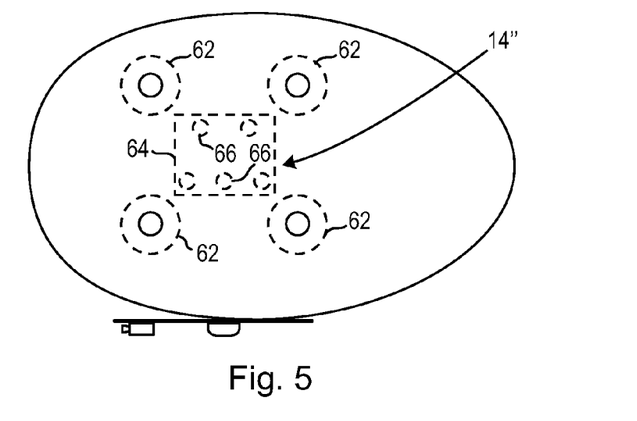
Figure 6:
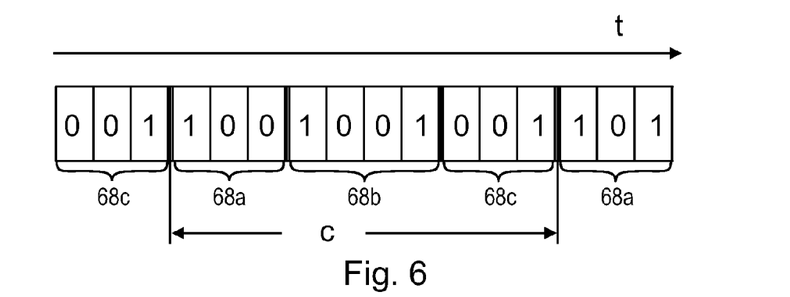
FIG. 6 shows a coding technique used according to the present disclosure.

FIGS. 5 and 6 shall detail the above introduced flexible AR marker 14" using LEDs. This has been so far explained with reference to the second embodiment shown in FIG. 2. For the better technical understanding it shall be briefly detailed in the following.

In contrast to fixed AR markers 14' (compare to FIG. 1), flexible LED-based AR markers 14" use guide LEDs 62 arranged in each corner of the AR marker 14". Similar as the rectangles 26 used in fixed AR markers 14', these guide LEDs 62 are used to determine the position of the AR marker 14". The ID pattern 64 of the AR marker 14" is generated by further LEDs 66. The system may thus recognize an LED marker 14" by first detecting the guide LEDs and then comparing the LED pattern inside the guide LEDs 62 with template patterns. Manchester coding (see FIG. 6) may be used to control the on/off pattern, because its use enables multiple markers to be projected onto the blimp 12. With this coding, it is easy to identify several distinct markers. The system creates bit array information ones every ten frames. The first three bits are used as a start bit 68a, the next four are used as an ID bit 68b, and the last three bits 68c are used to check for errors. "c" indicates one cycle. Using the position indicated by the guide LEDs 62, the system calculates a model view matrix and sets the 3D object onto the image. This process has been explained above.

The system may switch between using Manchester coding and the conventional paper-based method depending on the light conditions. This sensitivity to the environment enables the system to flexibly change the LED on/off pattern to enhance performance. Independent on using fixed or flexible AR markers 14, it is to be understood that of course not only one, but a plurality of (different) markers may be arranged on the blimp 12. Thus, it is also conceivable that the blimp 12 has a different appearance depending on the observer's side and viewing angle.

Figure 7:
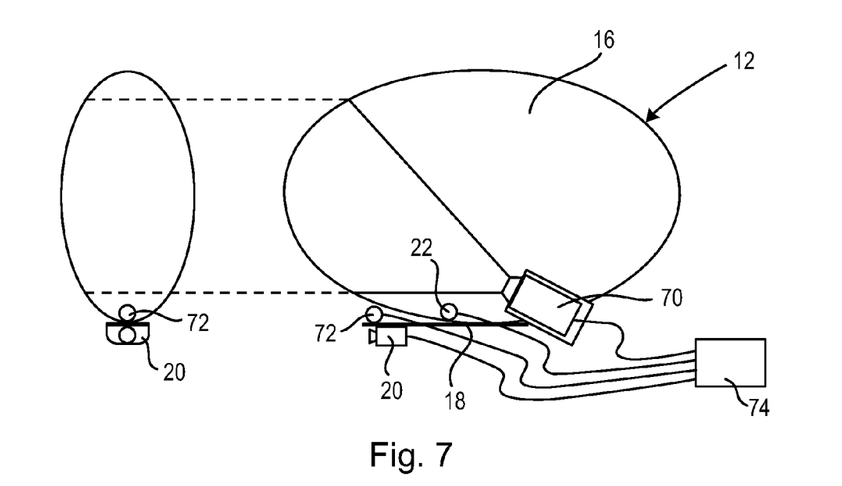
FIG. 7 shows exemplary side views schematically illustrating a third embodiment of the augmented reality system according to the present disclosure, FIG. 8 schematically illustrates a practical appliance of the augmented reality system according to the present disclosure, FIG. 9 schematically shows a drive concept to move an unmanned flying object according to an embodiment of the present disclosure, and FIG. 10 schematically illustrates an alternative drive concept to move the unmanned flying object according to another embodiment of the present disclosure.

According to a further embodiment schematically illustrated in FIG. 7, the augmented reality system 10 according to the present disclosure may comprise a projector 70 that is arranged within the gas-filled envelope 16 of the blimp 12 and configured to project an image on the envelope 16. As already introduced above with reference to FIG. 1, the blimp 12 may further comprise a camera 20, a speaker 22 and a microphone 72. The projector 70, the camera 20, the speaker 22 and the microphone 72 may, for example, be arranged on the gondola 18 which could be realized as a thin balsa-wood plate. Several sensors and a battery 74 may be arranged within the gondola 18. These items 20, 22, 70 and 72 may be carried by the blimp 12 of course dependent on the amount of helium the blimp 12 contains. Thus, it may be preferable to use a larger blimp 12 or add extra helium to carry additional modules and batteries. The camera 20 may detect human gestures of observers surrounding the blimp 12 and may obtain real-world images. Since the speaker 22 is attached to the blimp 12, the entire blimp 12 becomes a speaker. The projector 70 may, for example, project the images gained with the camera 20 onto the outer surface 24 of the envelope 16 of the blimp 12. The blimp 12 therefore works as a floating screen that may float over the observer's heads.

When using the blimp 12 as a screen, one semi-sphere of the blimp's envelope 16 may be a white vinyl sheet (or painting white) and the other semi-sphere may be a transparent vinyl sheet. By using the information captured by the camera 20, the blimp 12 could adjust its position and orientation automatically. According to an embodiment such a camera 20 may also be installed externally, locally separated from the blimp 12. For example, a camera could be arranged at a fixed position within a room. This camera may then capture the blimp 12 or a plurality of blimps 12 from outside.

According to another embodiment, the camera 20 could be used for other appliances. If two users appeared in front of the camera 20, two blimps could move in front of them and combine to create a bigger screen. If the users then moved apart, the blimps could separate and move in front of each user to display the information. One big screen could also be created by using several small blimps.

The blimp 12 (also called "Aerotop Interface") according to this embodiment allows users to choose three projection modes: display mode, projector mode and screen mode. Since the system 10 uses digital data, a computer connected to the network dynamically changes the projected information. The display mode may be used to project content onto the surface 24 of the blimp. Many users can see the blimp 12 at the same time and can share information. This mode is used for digital signage.

The projector mode allows the interface to function as an actual projector, so it can be used to project digital content (e.g. images, movies and web information) outside the blimp 12 such as onto the floor or into a wall. Thus, users can share information by using these surfaces.

In the screen mode, the surface 24 of the blimp 12 works as a screen. An outside projector projects information onto the blimp's surface 24.

By using such a blimp 12 it is also possible that users can communicate with one another through such a blimp 12. The user can control the blimp's position and attributes through a PC connected to the network. Since a video camera 20 is attached to the blimp 12, and the user's attributes are displayed on the blimp 12, each user can recognize the other user's facial attributes. By looking at the blimp 12 behaviour and facial attributes, other members can identify his/her feelings. Such an avatar can express a wide variety of emotions (e.g. happy, surprised, sad, angry as well as typical calm expressions). By changing the facial attributes, the user can express his/her feelings and impressions in detail through blimp images. Moreover by changing the blimp angle and position, the user can express his or her feelings. For example, if a meeting is boring, the blimp's direction can change so that it is looking away from the presenter. Attendees can understand the user's feelings through such gestures. This blimp system can of course also be combined with the above-described augmented reality system 10 according to the present disclosure, wherein virtual information is augmented onto the blimp's surface so that the blimp 12 itself becomes a virtual avatar.

Figure 9A:
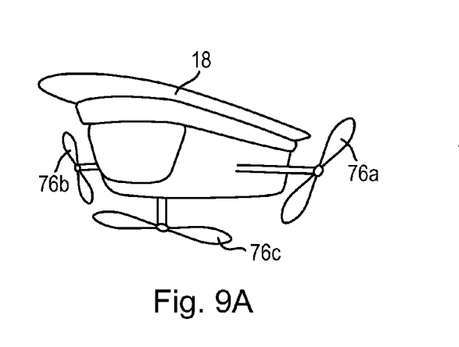
Figure 9B:
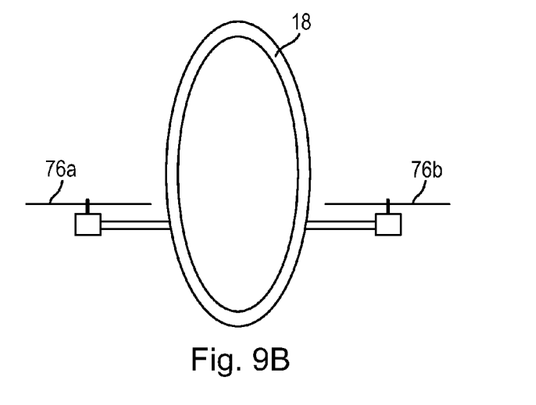
Figure 10:
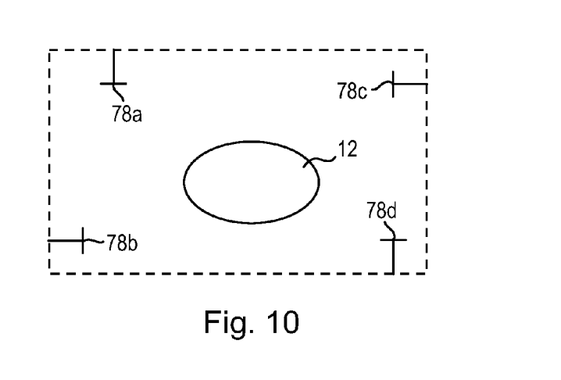

Finally, with reference to FIGS. 9 and 10, the way of moving the blimp 12 shall be outlined. According to an embodiment shown in FIG. 9, several actuators 76*a-c* may be arranged on the gondola 18 of the blimp 12 that allow controlling the movement of the blimp 12. It is to be noted that the envelope 16 of the blimp 12 is, for simplicity reasons, not shown in FIG. 9. The gondola 18 may for example use three propellers 76*a-c* to control the blimp's movement. The propellers 76*a-c* may either be controlled by the above-described MPU 40 or by an external radio controller with which a user may manoeuvre the blimp 12.

Another way of controlling the movement of the blimp 12 is by setting several wind generator units 78*a-d* in a room. In this case, the blimp 12 can move around the room without a gondola 18. Such a situation is schematically shown in FIG. 10. In both cases, the buoyancy of the blimp 12 may be controlled by the total amount of helium contained within the gas-filled envelope 16.

It is to be noted that the same principles as exemplarily described above can also be used in order to move the unmanned moving object 12 in case it is not realized as a blimp. Any type of actuator may be used to move the unmanned moving object 12 around. The one or more actuators used thereto may be either controlled directly by a person (e.g. using a radio-controller), or a software may be used that is integrated into the AR system. However, the one or more actuators may also be uncontrolled or controlled randomly.

In summary, the present disclosure presents an augmented reality system including an AR marker that has both a virtual appearance and a physical appearance. According to embodiments, it is implemented by using a blimp 12 and has two advantages compared to conventional AR systems: mobility and physicality. The "Aero-Marker" blimp floats in the air and can move toward a potential user. The Aero-Marker has a physical volume because it is implemented using a physical blimp. Virtual information is overlaid on the entire surface of the blimp, making the virtual information tangible.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

The invention claimed is:

1. Augmented reality system, comprising:
an unmanned moving object;
an augmented reality marker arranged on or within said unmanned moving object, the augmented reality marker being used for identifying an image associated with the augmented reality marker;
processing circuitry configured to
receive an image of a real environment including the unmanned moving object;
detect the augmented reality marker arranged on or within said unmanned moving object based on the received image;
identify the image associated with the augmented reality marker based on the detected augmented reality marker;
map the determined image associated with the augmented reality marker on the unmanned moving object;
generate an overlaid image by overlaying the mapped image on the unmanned moving object in the received image of the real environment; and
output the generated overlaid image to a display,
wherein
the unmanned moving object is an unmanned flying object,
the unmanned flying object is a blimp comprising a gas-filled envelope,
the gas-filled envelope has an outer surface, and
the processing circuitry is configured to map said image associated with the augmented reality marker on the entire outer surface of the gas-filled envelope.

2. The augmented reality system according to claim 1, wherein the processing circuitry is configured to use texture mapping to virtually overlay said image associated with the augmented reality marker on the outer surface of the unmanned moving object.

3. The augmented reality system according to claim 1, further comprising at least one actuator to change a position of the unmanned moving object.

4. The augmented reality system according to claim 3, further comprising:
at least one ultrasonic sensor that is arranged on or within the unmanned moving object and detects obstacles in the surrounding of the unmanned moving object and generates a corresponding detection signal; and movement control circuitry configured to control an operation of the at least one actuator in dependence of the detection signal.

5. The augmented reality system according to claim 1, further comprising at least one light source arranged on or within the blimp that projects the augmented reality marker on the envelope of the blimp.

6. The augmented reality system according to claim 5, further comprising lighting control circuitry that controls the at least one light source in order to project a plurality of different augmented reality markers on the envelope of the blimp in response to user input.

7. The augmented reality system according to claim 1, further comprising a projector that is arranged within the gas-filled envelope of the blimp and configured to project a projection image on the envelope.

8. The augmented reality system according to claim 1, wherein the unmanned moving object comprises at least one touch sensor, wherein the image associated with the augmented reality marker mapped on the unmanned moving object is changed by touching the at least one touch sensor.

9. The augmented reality system according to claim 8, wherein the at least one touch sensor comprises conductive threads arranged over the entire outer surface of the unmanned moving object.

10. The augmented reality system according to claim 1, wherein the processing circuitry is configured to:

detect a motion, a spatial orientation and a distance of the augmented reality marker arranged on or within said unmanned moving object relative to an observer; and adapt a size, orientation and position of the image associated with the augmented reality marker mapped on the unmanned moving object according to the detected motion, the spatial orientation and the distance of the augmented reality marker arranged on or within said unmanned moving object relative to the observer.

* * * * *